125,837

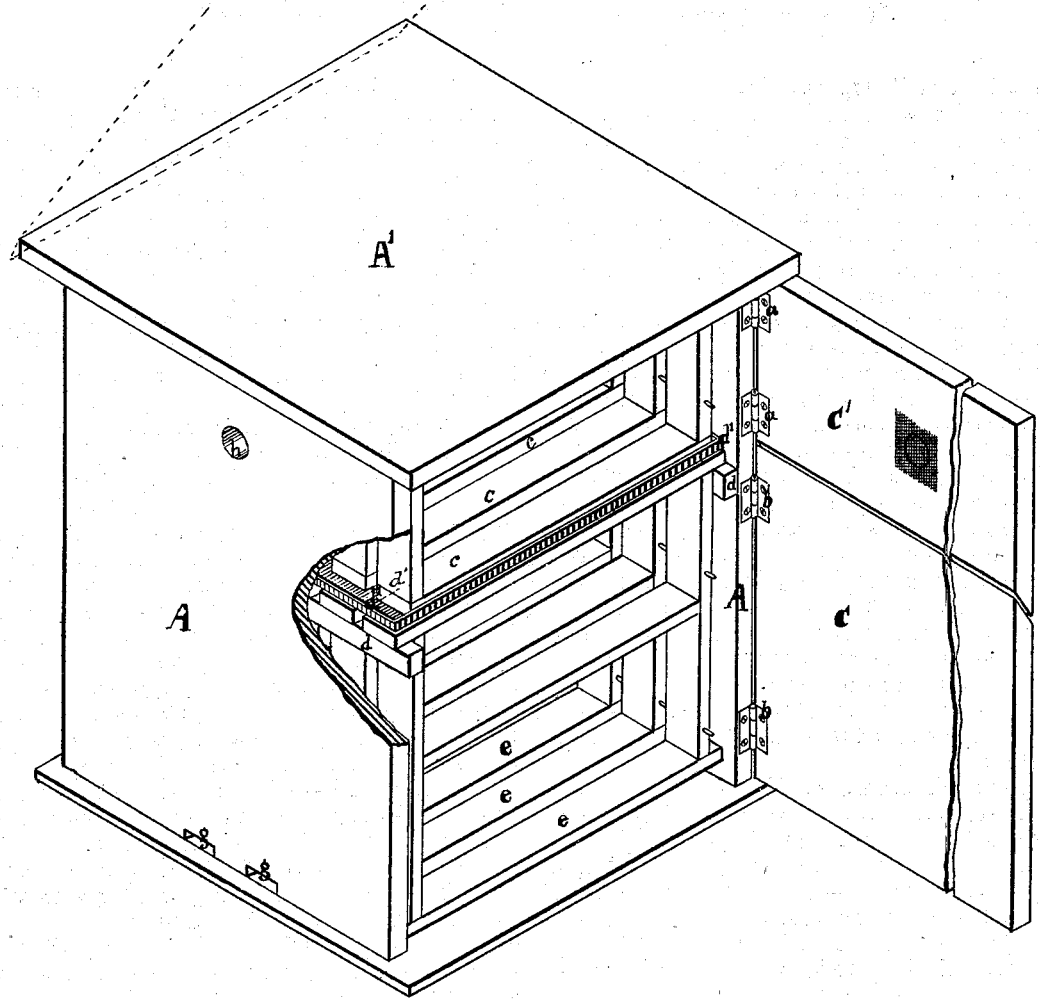

UNITED STATES PATENT OFFICE.

CHARLES S. NEWSOM, OF GALLIPOLIS, OHIO.

IMPROVEMENT IN BEE-HIVES.

Specification forming part of Letters Patent No. 125,837, dated April 16, 1872.

*To all whom it may concern:*

Be it known that I, CHARLES S. NEWSOM, of Gallipolis, county of Gallia and State of Ohio, have invented certain new and useful Improvements in Bee-Hives; and I do hereby declare that the following is a full, clear, and exact description thereof, reference being had to the accompanying drawing with the letters of reference marked thereon.

The nature of my invention consists in the construction of a bee-hive made of a box square, or nearly so, as may be desired, with two sets or rows of hanging frames—viz., an upper and lower row—for the convenience of the bees and for detaching honey for use of the table, &c.; also, making the front of the hive in two doors, to correspond in convenience and utility with the rows or sets of frames, and hanging the top on hinges as a door to be raised to assist in extracting the honey in the upper row of frames, and with holes in the sides opposite the upper frames for the admission of smoke into the chamber of upper frames to drive the bees down into the lower row of frames, and the use of a cut-off or slide to be passed between the two rows of frames when required so to do.

To enable others skilled in the art to make and use my invention, I will proceed to describe its construction and operation.

In the construction of my invention I make my hive of wood—both the outer box and frames—and in the following proportions: In height, nineteen inches; from front to rear, fourteen inches; and twelve inches wide—or any required size can be constructed.

In the drawing, A A represent the sides of the hive or box; A', the top; C, the lower door; and C', the upper door. These doors make the front of the hive. They are hinged to the main frame or box, as seen at letters *a a* and *b b*, thus designating the upper and lower doors. *c c c*, the frames for holding the honey, and are made about one and a fourth inch wide, to conform to the thickness of a bee-comb. These frames hang suspended on cleats firmly attached to the inner side of the box or hive. These frames are placed in position by opening the top up out of the way, as seen in dotted lines in the drawing, when said frames are easily set down into position, their outer ends resting on the cleats, or they can be placed in position by opening the front door C' and setting them in on the cleats. They can be taken out either at the front or top, as desired, when honey is required. *e e e* are the lower row of frames, of the same size as these described, and are suspended in the same way on the cleats. This set or row of frames is deeper than the upper row, as they are for the purpose of feeding and breeding, and it is not contemplated to detach honey at any time from these frames. Between the upper and lower rows of frames I leave a space of about one inch for the introduction of a piece of tin plate, *d'*, or other suitable piece of metal the size of the box, to cut off the entrance of the bees to the upper set of frames when I wish to take honey out of the frames. I also leave a space of about one inch below the lower frames for the free ingress through the hive, and to assist in cleaning the same when desired to so do. *g g* are holes on the sides and bottom of the hive for the ingress and egress of the bees. Space is also left between the outer walls of the hive and the frames to allow the bees room to pass up and down in the hive. The holes in the sides marked *h*—only one being shown in the drawing—are to admit of smoke being forced into the hive to drive the bees down into the lower set of frames before sliding in the cut-off *d'*. The hole in front upper door with wire-gauze is to admit air to the hive.

In the operation of my invention, when the bees are set to work in my hive, as bees always work up, the honey is deposited first in the upper set of frames; then, when these frames are filled with honey, the bees build and deposit below for feeding and breeding. It is in this lower part of my hive that the bees live. When I desire to detach honey I open the upper door, and if I find the front frames are full, I can easily detach one or more frames in front; or, if these in front are not filled, I raise the top and select a full frame of honey from the rear; then I close down the top A'; but if I find bees in the upper part of the hive I use smoke which is forced into the hive through holes *h*; and when the bees have passed down I insert the cut-off *d'*, and shut them in the lower frames, and do not open the lower door, but leave the bees in the dark, and then I take out the honey, as above set forth. I can thus readily control the bees, and at any time get what honey I wish to detach.

Thus it will be seen that I construct a very cheap, efficient, and easily-operated bee-hive, in which the keeper has complete control over his bees, and need not be stung or disturb the young brood of bees in the act of detaching honey.

Having thus described my invention, what I claim as new, and desire to secure by Letters Patent, is—

The two sets or rows of frames $c\ c\ c$ and $e\ e$, in combination with the doors C and C', hinged top A', and cut-off $d'$, when constructed and operating substantially as and for the purposes set forth.

CHARLES S. NEWSOM.

Attest:
LEWIS NEWSOM,
J. L. NEWSOM.